(12) United States Patent
Nago

(10) Patent No.: US 7,677,365 B2
(45) Date of Patent: Mar. 16, 2010

(54) BICYCLE RIM BRAKE ASSEMBLY

(75) Inventor: Daisuke Nago, Sakai (JP)

(73) Assignee: Shimano Inc., Osaka (JP)

( * ) Notice: Subject to any disclaimer, the term of this patent is extended or adjusted under 35 U.S.C. 154(b) by 217 days.

(21) Appl. No.: 11/411,848

(22) Filed: Apr. 27, 2006

(65) Prior Publication Data

US 2007/0023237 A1  Feb. 1, 2007

(30) Foreign Application Priority Data

Jul. 26, 2005 (JP) .............................. 2005-215312

(51) Int. Cl.
*B62L 1/06* (2006.01)
(52) U.S. Cl. ................ 188/24.19; 188/24.12; 188/24.22
(58) Field of Classification Search .............. 188/24.19, 188/24.11, 24.12, 24.14, 24.15, 24.21, 24.22
See application file for complete search history.

(56) References Cited

U.S. PATENT DOCUMENTS

| | | | | |
|---|---|---|---|---|
| 4,009,768 | A | * | 3/1977 | Fujii ........................ 188/24.22 |
| 4,511,018 | A | * | 4/1985 | Scott ........................ 188/24.12 |
| 4,553,641 | A | | 11/1985 | Scott et al. |
| 4,838,387 | A | * | 6/1989 | Yoshigai ................... 188/24.21 |
| 4,852,698 | A | | 8/1989 | Nagano |
| 4,896,753 | A | * | 1/1990 | Sule ............................ 188/344 |
| 5,819,880 | A | * | 10/1998 | Ota et al. .................. 188/24.22 |
| 5,996,743 | A | * | 12/1999 | Tseng ...................... 188/24.19 |
| 6,412,605 | B2 | * | 7/2002 | Campagnolo ............ 188/24.11 |
| 6,454,055 | B1 | | 9/2002 | Coons et al. |

FOREIGN PATENT DOCUMENTS

| | | |
|---|---|---|
| BE | 383874 | 12/1931 |
| DE | 4328758 | 3/1995 |
| DE | 4329214 | 3/1995 |
| EP | 0010417 | 4/1980 |
| EP | 0203546 | 12/1986 |
| FR | 586758 | 4/1925 |
| FR | 619795 | 4/1927 |
| GB | 412346 | 6/1934 |
| GB | 412373 | 6/1934 |
| GB | 420844 | 12/1934 |
| GB | 598750 | 2/1948 |
| GB | 1038994 | 8/1966 |
| JP | 55-56795 | 10/1978 |
| JP | 04-11193 | 1/1992 |
| JP | 04-11194 | 1/1992 |
| TW | M245157 | 10/2004 |

* cited by examiner

*Primary Examiner*—Robert A Siconolfi
*Assistant Examiner*—Mariano Sy
(74) *Attorney, Agent, or Firm*—Global IP Counselors, LLP

(57) ABSTRACT

A bicycle rim brake assembly includes a fastening shaft, a mounting part, a pair of brake arms and a pair of brake shoe attaching parts. The fastening shaft extends in an axial direction and is configured for attachment to a portion of a bicycle frame adjacent to the bicycle wheel. The mounting part includes a fastening portion that is configured such that the fastening shaft extends through the fastening portion. The mounting part and the fastening portion are movable between a plurality of mounting positions relative to the fastening shaft along a first direction that intersects the axial direction. The brake arms are supported in a freely pivotal manner on an outer perimeter of the mounting part. The brake shoe attaching parts are provided on respective ones of the brake arms.

3 Claims, 8 Drawing Sheets

BICYCLE RIM BRAKE ASSEMBLY

CROSS-REFERENCE TO RELATED APPLICATIONS

This application claims priority under 35 U.S.C. §119 to Japanese Patent Application No. 2005-215312. The entire disclosure of Japanese Patent Application No. 2005-215312 is hereby incorporated herein by reference.

BACKGROUND OF THE INVENTION

1. Field of the Invention

This invention generally relates to a bicycle rim brake assembly. More specifically, the present invention relates to a bicycle rim brake assembly configured to apply a braking force to a rim of a wheel of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake assembly.

One well-known example of a bicycle rim brake assembly is the caliper brake. A caliper brake is configured to apply a braking force to the wheel of a bicycle by pinching the rim of the wheel with a pair of brake shoes attached to a pair of brake arms. Caliper brakes are designed such that the position of the brake shoes can be adjusted up and down so that the brake shoes contact appropriate surfaces on the rim. In a conventional caliper brake, a vertically elongated oblong hole is provided in each brake arm and a bolt for fastening the brake shoe is inserted through each oblong hole. With this conventional design, the process of adjusting the vertical positions of the two brake shoes is troublesome because the vertical position of each of the two brake shoes must be adjusted separately.

Another example of a bicycle rim brake assembly is a center pull caliper brakes that includes a fastening arm that supports the brake arms on a bicycle such that brake arms freely pivot on the fastening arm. In such a conventional design (e.g., Japanese Laid-Open Utility Model Publication No. 55-56795) the fastening member is vertically adjusted to align the brake shoes vertically with the bicycle tire rim. The fastening arm has an outer anchoring part configured to secure the outer casing of a brake cable and pivotal support parts configured to support both brake arms in a freely pivotal manner. A vertically elongated oblong hole is formed in the fastening arm. A bolt for fastening the brake device to the frame is inserted through the elongated hole and fastened to the frame of the bicycle. The vertical positions of the brake shoes are adjusted by adjusting the mounting position of the fastening arm, thereby adjusting the vertical position of the entire brake assembly. Thus, with this conventional design, the process of adjusting the vertical positions of the brake shoes is simplified because a fastening arm that is separate from the brake arms is provided and the vertical positions of both brake shoes can be adjusted simultaneously by adjusting the position of the fastening arm. Additionally, since the position of the pivotal center of the brake arms does not change relative to the positions of the brake shoes, the braking ratio of the two brake arms of the brake device does not change.

With the conventional center pull caliper brake described above, the process of changing the vertical positions of the brake shoes is simplified because the existence of the fastening arm enables the vertical positions of both brake shoes to be adjusted by moving the entire brake device up and down. However, the fastening arm has a complex structure that includes the outer anchoring part (which secures the outer casing of the brake cable), two left and right pivotal support parts (which support the brake arms in mirror image positions in a freely pivotal manner), and the elongated oblong hole for adjusting the vertical position. In short, since the conventional design requires a fastening arm having a complex structure to be provided in order to adjust the vertical positions of the brake shoes more easily, the structure of the entire brake device is also more complex.

In view of the above, it will be apparent to those skilled in the art from this disclosure that there exists a need for an improved bicycle rim brake. This invention addresses this need in the art as well as other needs, which will become apparent to those skilled in the art from this disclosure.

SUMMARY OF THE INVENTION

One object of the present invention is to provide a bicycle rim brake assembly that employs a simple structure to enable the positions of the brake shoes to be adjusted.

A bicycle rim brake assembly in accordance with a first aspect of the present invention is a bicycle rim brake assembly capable of being mounted to a bicycle frame. The bicycle rim brake assembly includes at least one mounting part, a pair of brake arms, and a pair of brake shoe attaching parts. The mounting part includes a fastening portion configured to be mounted on a fastening shaft that extends in an axial direction through the fastening portion for attachment to a bicycle frame. The mounting part and the fastening portion are movable between a plurality of mounting positions relative to the fastening shaft along a first direction that intersects the axial direction. The brake arms are supported in a freely pivotal manner on an outer perimeter of the mounting part and the brake shoe attaching parts are provided on respective ones of the brake arms.

With this bicycle rim brake assembly, the brake arms are supported on a perimeter of the mounting part and the fastening shaft extends through the fastening portion of the mounting part in order to mount the bicycle rim brake assembly to the bicycle frame. The fastening portion is configured such that the location of the bicycle rim brake assembly relative to the fastening shaft (and the bicycle frame) can be adjusted to a plurality of positions along the first direction that intersects with the axial direction of the fastening shaft. Thus, the corresponding vertical positions of the brake shoes can be adjusted if the first direction corresponds approximately to the vertical direction. Similarly, the corresponding horizontal positions of the brake shoes can be adjusted if the first direction corresponds approximately to a horizontal (left to right) direction. Furthermore, both the horizontal and vertical positions can be adjusted simultaneously by setting the first direction to a diagonal direction. Since the fastening portion enables re-positioning of the bicycle rim brake assembly relative to the fastening shaft (and the bicycle frame) to any of a plurality of positions along the first direction, and with the brake arms supported on the perimeter of the mounting part, the positions of the brake shoes can be adjusted with a simple-structured mounting part that has the fastening portion arranged inward from the perimeter on which the brake arms are supported. As a result, the ability to adjust the positions of the brake shoes is obtained with a simplified structure.

A bicycle rim brake assembly in accordance with a second aspect of the present invention is a bicycle rim brake assembly according to the first aspect, wherein the fastening portion has a plurality of through holes arranged along the first direction to selectively receive the fastening shaft. With this bicycle rim brake assembly, the position of the brake shoes can be adjusted along the first direction by changing which of the through holes the fastening shaft is inserted through. The fastening portion can be easily manufactured because it is made by merely forming a plurality of through holes. Also, the brake can be fastened securely by configuring the through holes and the fastening shaft such that the gap there-between is small.

A bicycle rim brake assembly in accordance with a third aspect of the present invention is a bicycle rim brake assembly according to the first aspect, wherein the fastening portion has an oblong hole or elongated hole that is wide or long in the first direction. With this bicycle rim brake assembly, the position of the brake shoes can be adjusted along the first direction by freely changing the position where the fastening shaft is passed through the oblong hole. The position of the brake shoes can be adjusted to any desired position within the range of the length of the oblong hole.

A bicycle rim brake assembly in accordance with a fourth aspect of the present invention is a bicycle rim brake assembly according to any one of the first to third aspects, wherein the first direction approximately coincides with the vertical direction of the bicycle frame. With this bicycle rim brake assembly, the ability to adjust the vertical positions of the brake shoes is obtained with a simple structure.

A bicycle rim brake assembly in accordance with a fifth aspect of the present invention is a bicycle rim brake assembly according to any one of the first to fourth aspects, wherein each of the brake arms is supported in a freely pivotal manner on an intermediate portion of the mounting part. Further, the brake shoe attaching parts are provided at an end of respective ones of the brake arms to form a side pull caliper brake assembly. With this bicycle rim brake assembly, the ability to adjust the positions of the brake shoes is obtained with a simple structure and two brake arms are supported in a freely pivotal manner on the perimeter of a single mounting part. Consequently, there is one fastening portion for adjusting the position of the brake shoes and the positions of the brake shoes can be adjusted more easily.

A bicycle rim brake assembly in accordance with a sixth aspect of the present invention is a bicycle rim brake assembly according to any one of the first to fourth aspects, wherein the at least one mounting part includes a first mounting part and a second mounting part with the brake arms pivotally supported at an intermediate portion of a respective one of the first and second mounting parts and the brake shoe attaching parts provided at an end of respective ones of the brake arms. With this bicycle rim brake assembly, the positions of the brake shoes are adjusted at two locations because the brake arms are arranged separately on two different mounting parts. However, here too, since the fastening portions that receive respective ones of the fastening shafts allows for movement of the fastening portions relative to their respective one of fastening shafts along the first direction are provided within the mounting parts, with the brake arms are supported on perimeters of the mounting parts, the positions of the brake shoes can be adjusted with a simple-structure. As a result, the ability to adjust the positions of the brake shoes is obtained with a simple structure.

A bicycle rim brake assembly in accordance with a seventh aspect of the present invention is a bicycle rim brake assembly according to any one of the first to fourth aspects, wherein the at least one mounting part includes a first mounting part and a second mounting part with the brake arms pivotally supported at one end of a respective one of the first and second mounting parts and the brake shoe attaching parts provided at an intermediate portion of a respective one of the brake arms to form a cantilever caliper brake assembly. With this bicycle rim brake assembly, the positions of the brake shoes are adjusted at two locations because the brake arms are arranged separately on two different mounting parts. However, here, too, since the fastening portions that enable the fastening shaft to fasten the fastening portions in a plurality of positions along said first direction are provided in mounting parts on perimeters of which the brake arms are supported, the positions of the brake shoes can be adjusted with simple-structured mounting parts that have the fastening portions arranged on the inside of the perimeters on which the brake arms are supported. As a result, the ability to adjust the positions of the brake shoes is obtained with a simple structure.

With the present invention, since the fastening portions enable the fastening shaft to support the bicycle rim brake assembly in a plurality of positions along the first direction are provided in mounting parts, and the brake arms are supported on perimeters of respective ones of the mounting parts, the positions of the brake shoes can be adjusted with simple-structured mounting parts that have the fastening portions arranged on the inward from the perimeter of the mounting parts on which the brake arms are supported. As a result, the ability to adjust the positions of the brake shoes is obtained with a simple structure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
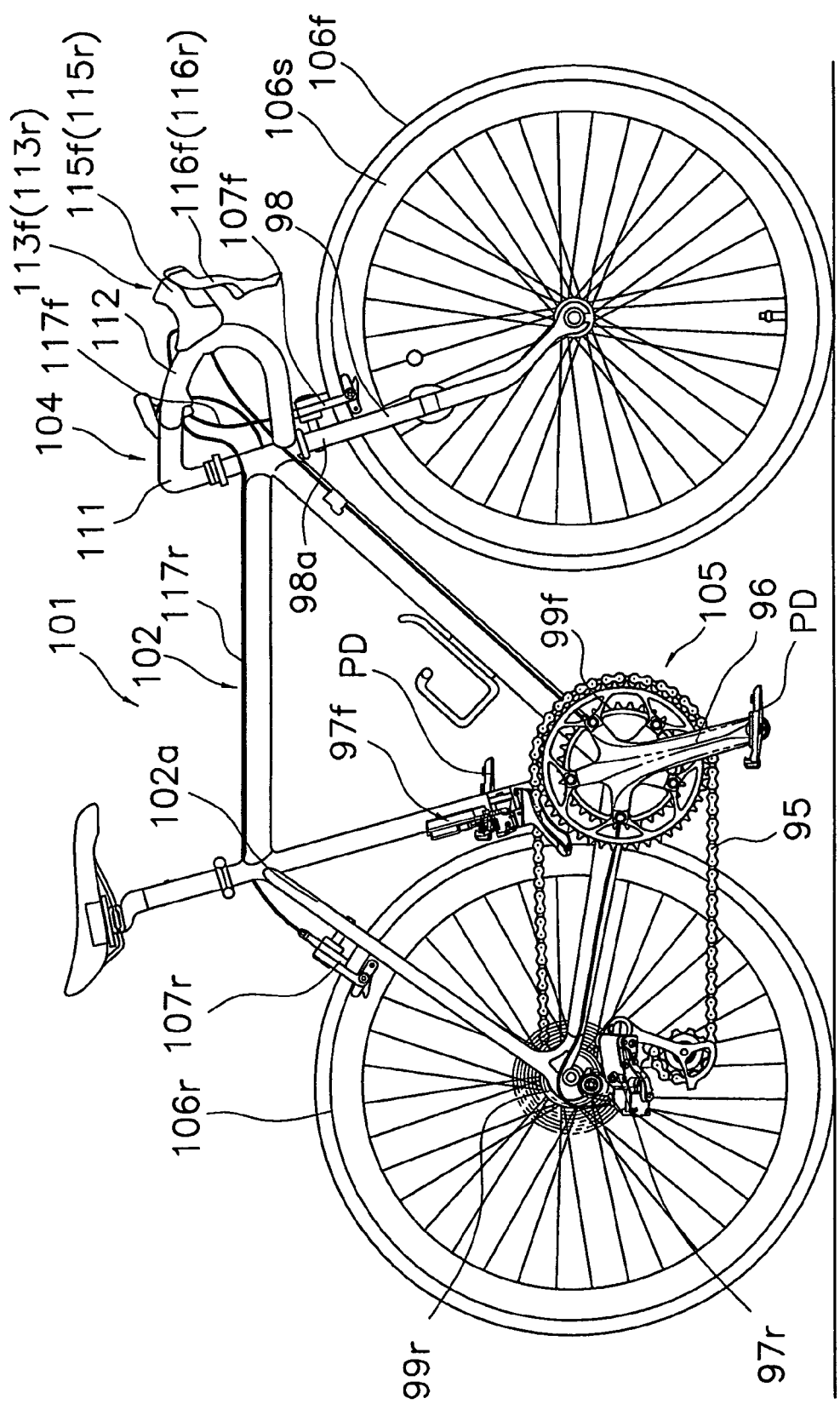
FIG. 1 is a side elevational view of a bicycle that includes a rim brake assembly in accordance with a first embodiment of the present invention.

Referring initially to FIG. 1, a bicycle 101 is illustrated in accordance with a first embodiment of the present invention. The overall design of the bicycle 101 is often referred to as a road racer or road style racing bike that includes: a diamond-shaped frame 102 having a front fork 98 and a handlebar unit 104 fastened to the front fork 98; a drive unit 105 that includes a crank 96 on which pedals PD and a chain 95 are mounted, front and rear derailleurs 97f and 97r, and front and rear sprocket clusters 99f and 99r; a front wheel 106f mounted to the front fork 98; a rear wheel 106r mounted to a rear portion of the frame 102; and front and rear brake assemblies 107f and 107r.

The handlebar unit 104 includes a handlebar stem 111 and a handlebar 112 fitted into and fastened to the upper end of the handlebar stem 111. The handlebar stem 111 is fitted into and fastened to an upper part of the front fork 98. The handlebar 112 is a drop-type handlebar equipped with a left-right pair of brake levers 113f and 113r. The brake levers 113f and 113r include front and rear brake brackets 115f and 115r that are mounted to the end sections of the handlebar 112 and front and rear lever members 116f and 116r that are mounted in a freely pivoting manner to the brake brackets 115f and 115r, respectively.

Figure 4:
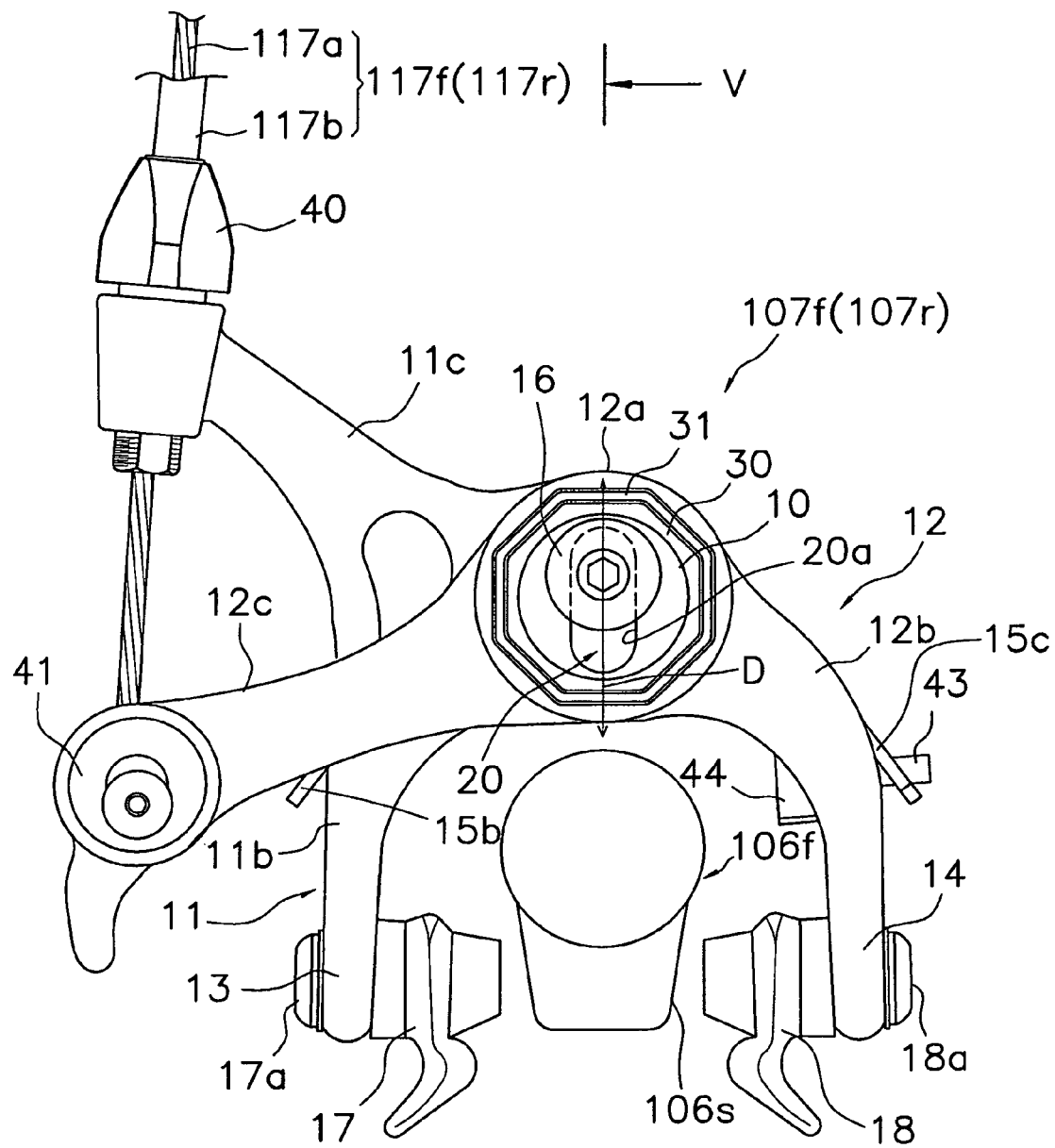
FIG. 4 is a front elevational view of a front rim brake assembly in accordance with a second embodiment of the present invention.

The front and rear brake levers 113f and 113r are connected to the front and rear rim brake assemblies 107f and 107r, respectively, with Bowden-type brake cables 117f and 117r. As shown in FIG. 4, each of the Bowden brake cables 117f and 117r has an inner cable 117a and an outer casing 117b through which the inner cable 117a can pass.

The front and rear rim brake assemblies 107f and 107r are almost identical in structure except that the rear rim brake assembly 107r is mounted to the seat stay 102a of the frame 102 of the bicycle 101. Although the explanation that follows focuses on the front rim brake assembly 107f, substantially the same description applies to the rear rim brake assembly 107r as well.

As shown in FIGS. 2 to 5, the front rim brake assembly 107f is a side pull caliper brake having a single centered pivot point. The front rim brake assembly 107f includes: a mounting part 10, a left-right pair of brake arms including a first brake arm 11 and a second brake arm 12, a first brake shoe attaching part 13 and a second brake shoe attaching part 14. The mounting part 10 is mounted to a fork crown 98a (see FIG. 1) of the front fork 98 of the frame 102. The first brake arm 11 and the second brake arm 12 are supported on the outer surface or outer perimeter of the mounting part 10 in a freely pivotal manner. The first brake shoe attaching part 13 is provided on the first brake arm 11, and the second brake shoe attaching part 14 is provided on the second brake arm 12. The front rim brake assembly 107f also has a spring member 15 serving to spring load the first and second brake arms 11 and 12 in a brake release direction, a fastening shaft 16 that extends through the mounting part 10 and is fastened to the fork crown 98a (FIG. 1), and brake shoes 17 and 18 that are fastened to the first and second brake shoe attaching parts 13 and 14.

Figure 2:
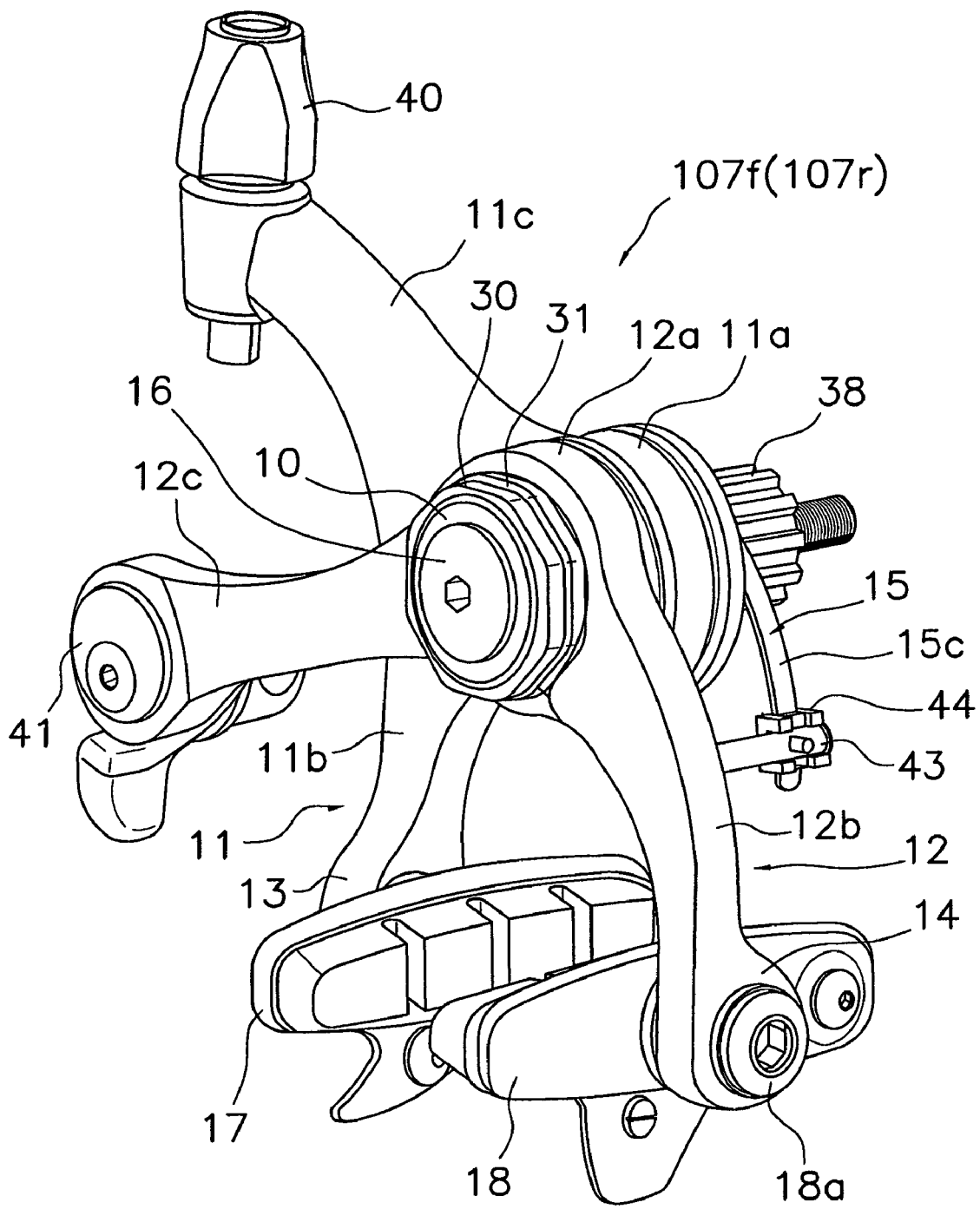
FIG. 2 is a perspective view of a front rim brake assembly removed from the bicycle in accordance with the first embodiment of the present invention.
Figure 3:
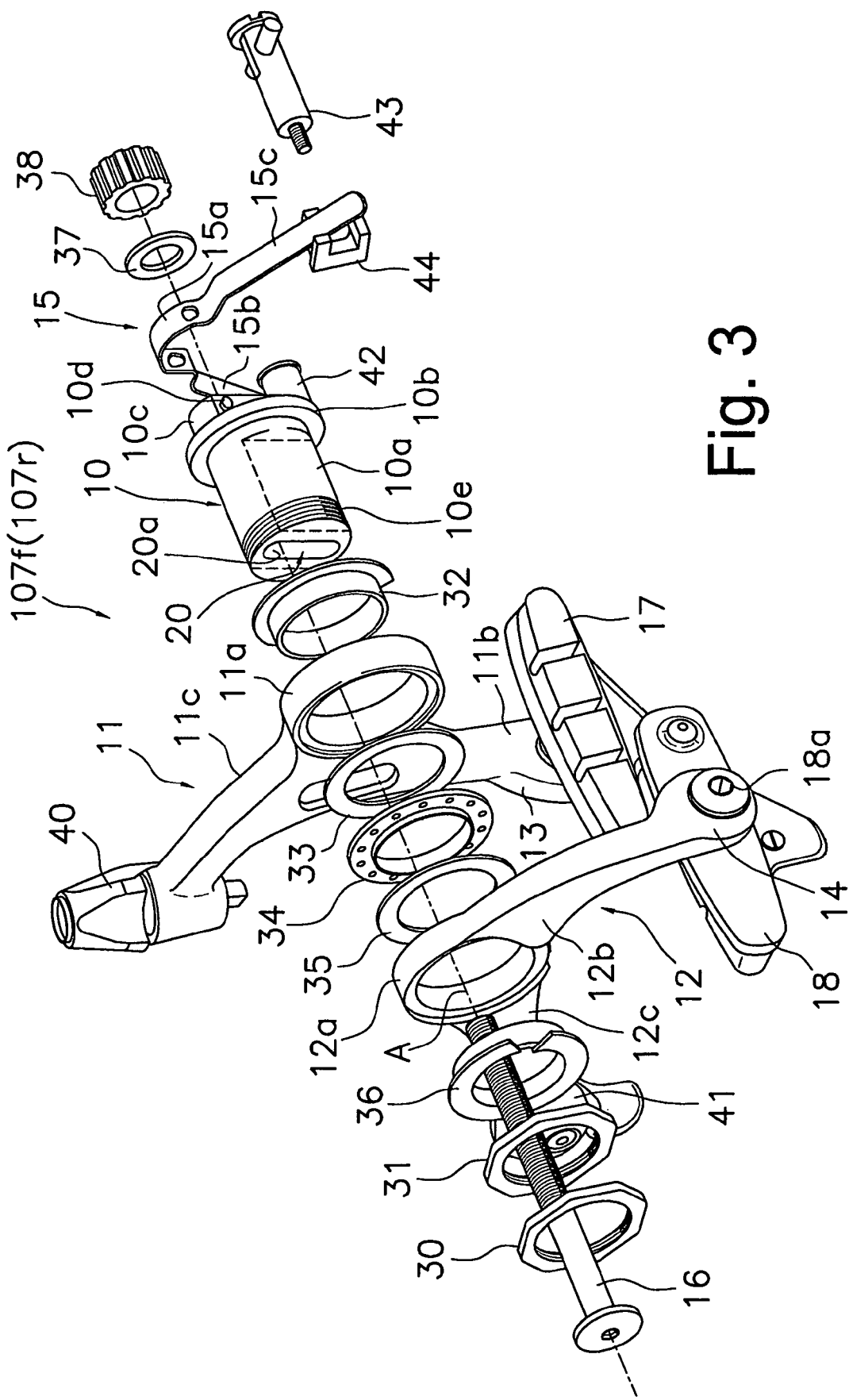
FIG. 3 is an exploded perspective view of the front rim brake assembly in accordance with the first embodiment of the present invention.

As shown in FIGS. 2 and 3, the mounting part 10 is a shaft-like member having a pivotal support section 10a, a flange 10b and a spring mounting section 10c. The pivotal support section 10a is configured such that at least a portion thereof has a circular external surface configured to support the brake arms 11 and 12 in a freely pivotal manner. Specifically, the brake arms 11 and 12 pivot about the pivotal support section 10a. The flange 10b is larger in diameter than the pivotal support section 10a. The spring mounting section 10c is configured for the spring member 15 to be mounted thereto. The mounting part 10 also has a fastening portion 20 that includes an elongated or oblong hole 20a configured such that the fastening shaft 16 for fastening the front rim brake assembly 107f to the fork crown 98a can pass there-through. Further, the fastening shaft 16 can be fastened at any position along a first direction D (FIGS. 4 and 5) that intersects with an axial direction A (FIGS. 3 and 5) of the fastening shaft 16. The oblong hole 20a is elongated along the direction D. The first direction D extends along a diameter of the mounting part 10. The oblong hole 20a extends through the mounting part 10 passing through the pivotal support section 10a, the flange 10b, and the spring mounting section 10c. When the front rim brake assembly 107f is mounted to the bicycle 101, it is preferred that the mounting part 10 be fastened such that the first direction D of the oblong hole 20a is generally aligned or approximately coincides with a vertical direction of the bicycle 101.

More specifically, in the depicted embodiment, the first direction D is a generally vertical direction that is inclined slightly from vertical in accordance with the shape and inclination of the frame elements of the bicycle 101 that the fastening shaft 16 attaches to. However, it should be understood from the drawings and the description herein that the mounting part 10 can be re-oriented such that the first direction D extends diagonally or horizontally, depending upon design considerations and specific bicycle requirements.

An externally threaded section 10e is formed on the external surface of one end of the pivotal support section 10a (frontward end when the mounting part 10 is mounted to the bicycle 101). The externally threaded section 10e is provided to installing two nuts 30 and 31. Once installed, the two nuts 30 and 31 retain the brake arms 11 and 12 on the mounting part 10.

The following components are fitted onto the pivotal support section 10a in order as listed (i.e., in order from closest to farthest from the flange 10b): a flanged bush 32, the first brake arm 11, a washer 33, a thrust bearing 34, a washer 35, the second brake arm 12, a flanged bush 36, the nut 31, and the nut 30. The flanged bushes 32 and 36 are preferably press fitted into the first and second brake arms 11 and 12 prior to fitting on the pivotal support section 10a. As indicated with a broken line in FIG. 3, the pivotal support section 10a can optionally be chambered on both sides of the oblong hole 20a in order to reduce weight.

The flange 10b is provided in order to position the brake arms 11 and 12 when they are mounted to the pivotal support section 10a. Specifically, the flange 10b restricts movement of the brake arms 11 and 12 in a direction generally parallel to the axial direction A of the fastening shaft 16.

The spring mounting section 10c is provided in order to secure the spring member 15. The spring member 15 includes a flat plate-like member with elastic properties that has been bent into a particular shape, as shown in FIG. 3. A pair of protrusions 10d is provided on the spring mounting section 10c for the purpose of securing the spring member 15. The flanged bushes 32 and 36 serve as bearings for supporting the first and second brake arms 11 and 12 on the mounting part 10 such that the first and second brake arms 11 and 12 are free to pivot about the outer surface of the mounting part 10. The thrust bearing 34 serves to enable the first and second brake arms 11 and 12 to pivot smoothly in opposite directions with respect to one another. The washers 33 and 35 serve to prevent the first and second brake arms 11 and 12 from becoming scarred or dented due to pressure when the nuts 30 and 31 are tightened. The nuts 30 and 31 are, for example, octagonal in shape and provide for the purpose of mounting the first and second brake arms 11 and 12 to the mounting part 10. Two nuts 30 and 31 are used in order to obtain a double nut locking effect.

The first brake arm 11 is arranged such that it is located on the right side in a rear view when the front rim brake assembly 107f is mounted to the bicycle 101. The first brake arm 11 has a tubular pivot mounting section 11a, a first arm section 11b and an outer anchoring arm 11c. The tubular pivotal mounting section 11a is located at the center of the front rim brake assembly 107f and mounted on the external circumferential surface of the mounting part 10 with the flanged bush 32 interposed there-between. The first arm section 11b curves from the pivotal mounting section 11a in such a shape as to avoid the front wheel 106f and has the brake shoe attaching part 13 formed integrally on the bottom end thereof. The outer anchoring arm 11c extends diagonally upward from the pivotal mounting section 11a on the same side of the front rim brake assembly 107f as the first arm section 11b. An outer anchoring part 40 is screwed onto the tip end of the outer anchoring arm 11c. The outer anchoring part 40 is configured to secure the outer casing 117b of the Bowden brake cable 117f such that axial movement of the outer casing 117b is restricted.

The second brake arm 12 is arranged such that it is located on the left side in a rear elevational view when the front rim brake assembly 107f is mounted to the bicycle 101. The second brake arm 12 has a tubular pivotal mounting section 12a, a second arm section 12b and an inner anchoring arm 12c. The tubular pivotal mounting section 12a is located at the center of the front rim brake assembly 107f and mounted on the external circumferential surface of the mounting part 10 with the flanged bush 36 interposed there-between. The second arm section 12b curves from the pivotal mounting section 12a in such a shape so as to avoid the front wheel 106f and has the brake shoe attaching part 14 formed integrally on the bottom end thereof. The inner anchoring arm 12c extends diagonally downward from the pivotal mounting section 12a on the opposite side as the second arm section 12b. An inner fastening portion 41 is provided on the tip end of the inner anchoring arm 12c to fasten (or attach) the inner cable 117a of the Bowden brake cable 117f. The inner fastening portion 41 provided such that it is positioned below the outer anchoring part 40 of the outer anchoring arm 11c of the first brake arm 11.

Each of the brake shoe attaching parts 13 and 14 has a circular through hole configured such that shoe fastening bolts 17a and 18a, respectively, for fastening a brake shoe 17 and 18 can extend there-through.

The spring member 15 is made of an elastic plate-like material that has been bent into a prescribed shape. The spring member 15 has a fastening section 15a and a pair of spring sections 15b and 15c. The fastening section 15a is configured to be fastened to the spring mounting section 10c of the mounting part 10. The spring sections 15b and 15c extend diagonally downward toward the first and second brake arms 11 and 12 from both ends of the fastening section 15a. Spring anchoring parts 42 and 43 for the spring sections 15b and 15c of the spring member 15 are fastened (with, for example, a screw connection) to respective intermediate portions of the first and second arm sections 11b and 12b of the first and second brake arms 11 and 12, as indicated in FIG. 4. A synthetic resin friction prevention member 44 is installed between the spring anchoring section 43 and the spring section 15c.

Figure 5:
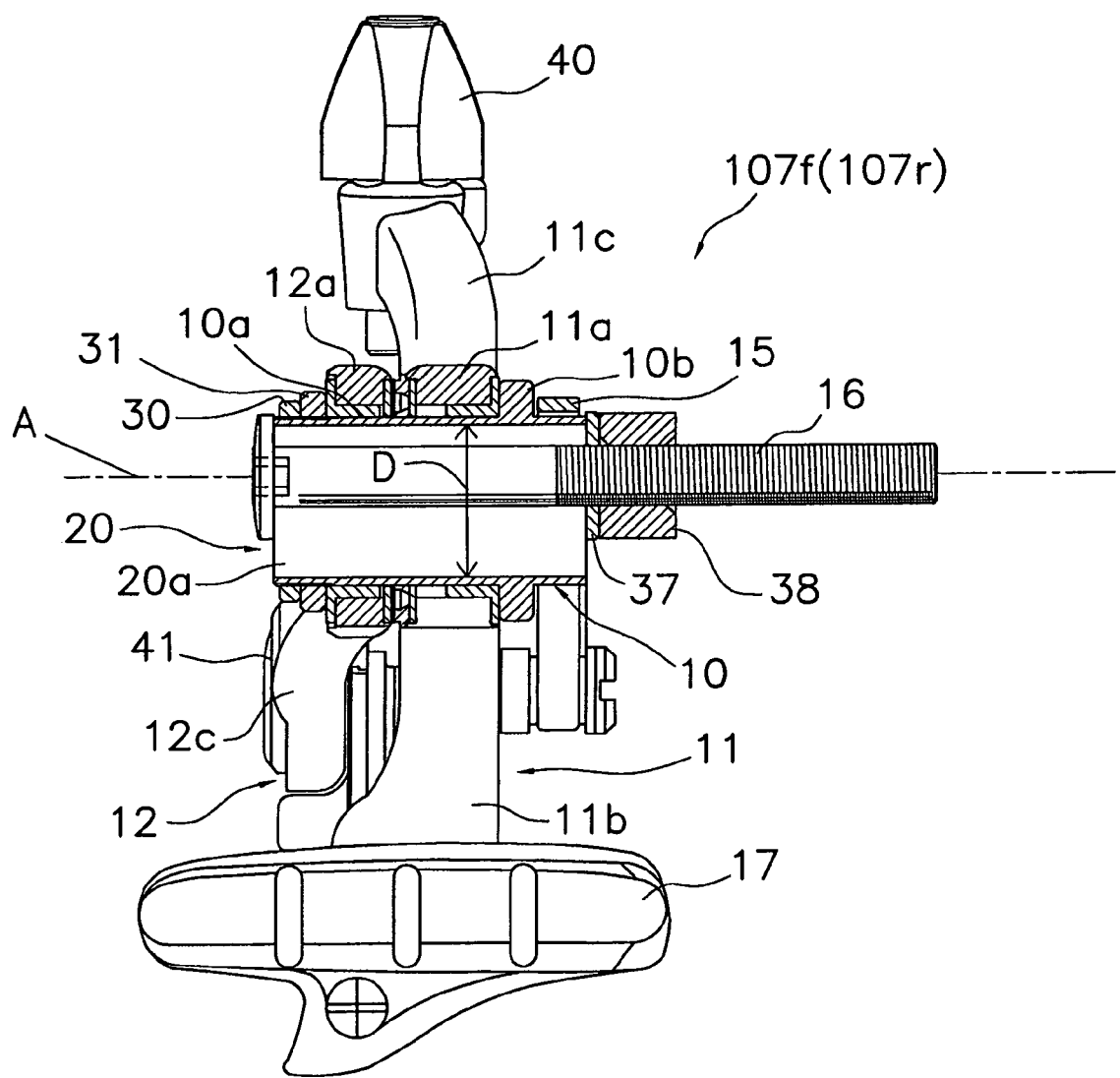
FIG. 5 is a cross sectional view of the front rim brake assembly taken along the section line V-V in FIG. 4 in accordance with the first embodiment of the present invention.

The fastening shaft 16 is a bolt having a flange-like head. The fastening shaft 16 extends through the mounting part 10 and the fork crown 98a (FIG. 1) and is secured with a nut at the end opposite of the head. As shown in FIGS. 3 and 5, a washer 37 and a spacer 38 are mounted on the fastening shaft 16 between the mounting part 10 and the fork crown 98a for adjusting the axial position of the front rim brake assembly 107f.

The braking operation of the rim brake assemblies 107f and 107r will now be explained.

When either of the brake levers 113f and 113r is operated while the bicycle 101 is being ridden with the brakes in a released state, the inner cable 117a is pulled and, thus, the second brake arm 12 to which the inner cable 117a is anchored is pulled. The second brake arm 12 moves against the spring force of the spring member 15 and pivots in the braking direction. Meanwhile, the first brake arm 11, to which the outer casing 117b is anchored, also pivots in the braking direction. Since the forces act in a similar fashion on both of the brake arms 11 and 12, the two brake arms 11 and 12 gradually pivot in the braking direction simultaneously in a symmetrical fashion. The brake shoes 17 and 18 then contact the rim 106s of the front wheel 106f and brake the front wheel 106f by pinching or clamping the rim 106s with a strength corresponding to the operating force exerted on the brake lever 113f.

In order to adjust the vertical position of the brake shoes 17 and 18 with respect to the rim 106s, the fastening shaft 16 is loosened and the mounting part 10 is moved up or down in the first direction D within the limits of the oblong hole 20a. The brake device 107f is moved to a position that is appropriate based on the shape of the rim 106s and fastened by tightening the fastening shaft 16. This completes the position adjustment of the brake shoes 17 and 18.

Since the fastening portion 20 has the oblong hole 20a, the fastening shaft 16 can be loosened allowing the mounting part 10 to be vertically adjusted in the first direction D in any desired position along the oblong hole 20a. Therefore, since the first and second brake arms 11 and 12 are supported on the outer perimeter of the mounting part 10, the vertical positions of the brake shoes 17 and 18 can be adjusted with a simple-structured mounting part 10 that has the fastening portion 20 arranged inward from the perimeter on which the first and second brake arms 11 and 12 are supported. As a result, the ability to adjust the positions of the brake shoes 17 and 18 is obtained with a simple structure.

In comparison with conventional structures in which the brake arms are supported in a freely pivotal manner directly on the outside circumference of the fastening shaft, the brake devices 107f and 107r in accordance with the present invention can provide a larger contact surface for supporting the brake arms 11 and 12 in a freely pivotal manner because the brake arms 11 and 12 are supported on the mounting part 10. In particular, the overall rigidity (or stiffness) of the braking mechanism with respect to the loads imposed on the pivotal mounting sections 11a and 12a of the brake arms 11 and 12 in the axial direction of the fastening shaft when the brake device is operated can be increased. Further, since the mechanism or structure that enables vertical adjustment of the brake shoes 17 and 18 is not located on the brake arms 11 and 12 in the area where the brake shoes 17 and 18 are supported, the brake arms 11 and 12 can be made more rigid.

Furthermore, with the brake devices 107*f* and 107*r* in accordance with the present invention, the structure surrounding the brake shoe attaching parts 13 and 14 can be simplified. Consequently, particularly in the case of side pull caliper brakes, the inner anchoring arm 12*c* can be positioned lower than in the case of a conventional brake device. As a result, the degree of freedom regarding the mounting position of the brake devices 107*f* and 107*r* and the arrangement of the brake cables 117*f* and 117*r* can be increased, thereby widening the range of design options.

Although in the above described embodiment the fastening portion 20 is configured such that the vertical position of the corresponding mounting part 10 can be adjusted, the present invention is not limited to a vertical position adjustment. For example, the oblong hole 20*a* of the fastening portion 20 can be arranged horizontally such that the transverse (left to right) position of the mounting part 10 can be adjusted or the fastening portion 20 can be arranged diagonally such that such that a diagonal position of the mounting part 10 can be adjusted.

Second Embodiment

Figure 6:
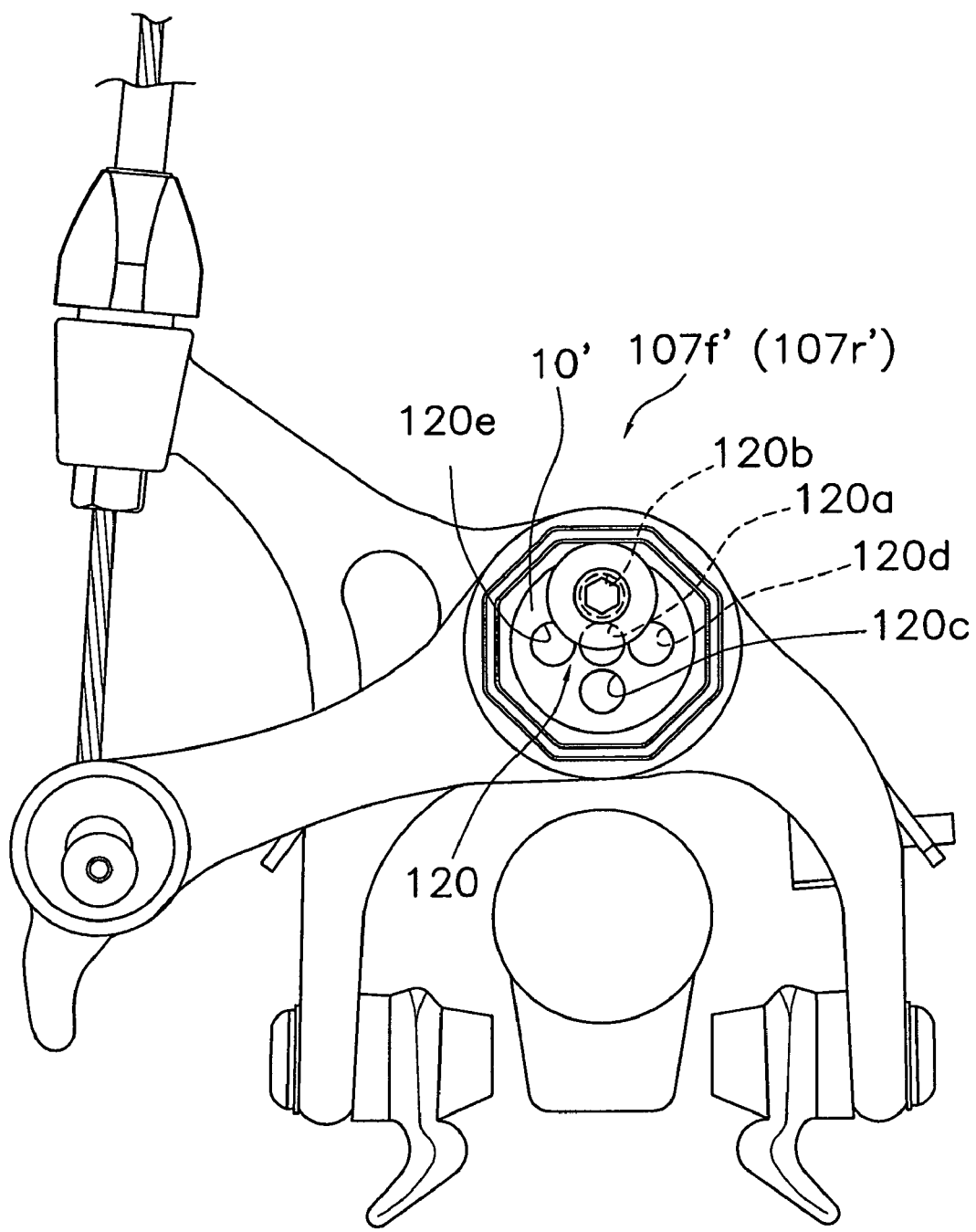
FIG. 6 is a front elevational view, similar to FIG. 4, showing a front rim brake assembly in accordance with a second embodiment of the present invention.

Referring now to FIG. 6, a front brake device 107*f'* (and a rear brake device 107*r'*) in accordance with a second embodiment will now be explained. In view of the similarity between the first and second embodiments, the descriptions of the parts of the second embodiment that are identical to the parts of the first embodiment may be omitted for the sake of brevity. The parts of the second embodiment that differ from the parts of the first embodiment will be indicated with a prime (') and new features will be provided with a new reference numeral. Further, since the front brake device 107*f'* and the rear brake device 107*r'* are substantially the same, only description of the front brake device 107*f'* is provided for the sake of brevity.

In the first embodiment, the fastening portion 20 of the mounting part 10 includes an oblong hole 20*a*. In the second embodiment, a mounting part 10' has been modified compared to the mounting part 10 of the first embodiment. Thus, the only difference between the first and second embodiments is the configurations of the mounting parts 10 and 10'. Specifically the mounting part 10' includes a fastening portion 120 that comprises a plurality of (e.g., three) through holes 120*a*, 120*b*, 120*c* aligned along a first direction, as shown in FIG. 6. The embodiment shown in FIG. 6 also has through holes 120*d* and 120*e* provided to the left and right of the center hole 120*a* so that the transverse position of the brake device can be adjusted when the brake device is in the center position with respect to the vertical direction. It is also acceptable to replace the through holes 120*d* and 120*e* with oblong holes.

Third Embodiment

Figure 7:
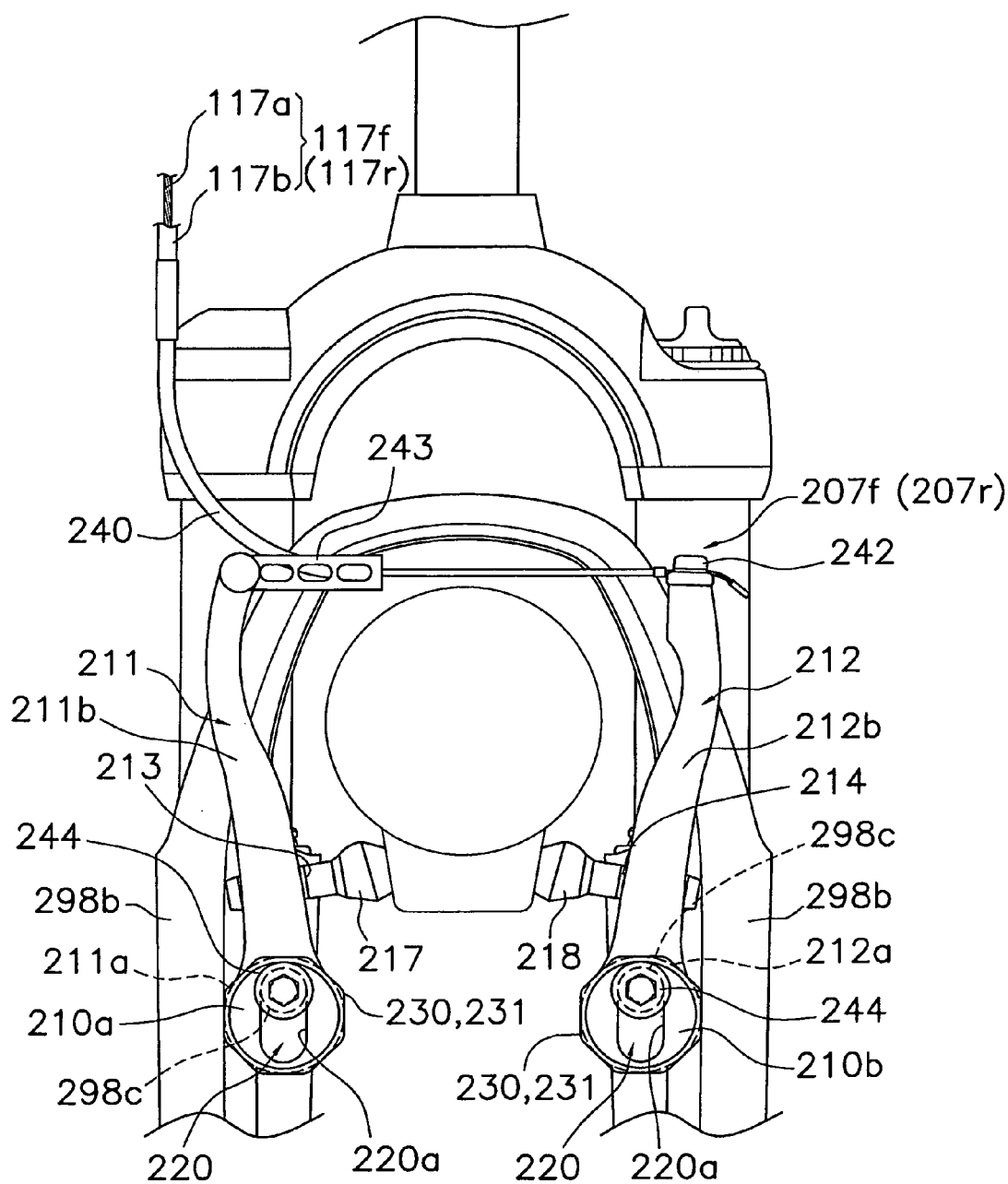
FIG. 7 is a front elevational view, similar to FIG. 4, showing a front rim brake assembly in accordance with a third embodiment of the present invention.

Referring now to FIG. 7, a cantilever caliper brake assembly 207*f* (a front rim brake assembly) in accordance with a third embodiment will now be explained. Since the cantilever caliper brake assembly 207*f* and a rear cantilever caliper brake assembly 207*r* are substantially the same, only description of the cantilever caliper brake assembly 207*f* is provided for the sake of brevity.

Although in the above described first and second embodiments of the present invention is configured in a side pull caliper brake, the first and second embodiments are just two examples of the present invention. Specifically, the present invention is not limited to side pull caliper brakes. The present invention can also be applied to any bicycle rim brake assembly having two brake arms that are configured to brake, pinch or clamp a bicycle rim. For example, the present invention can also be included in a cantilever caliper brake as shown in FIG. 7.

FIG. 7 shows an example of a cantilever caliper brake assembly 207*f* in accordance with the present invention. In the example shown in FIG. 7, the cantilever caliper brake assembly 207*f* includes first and second mounting parts 210*a* and 210*b*. Each of the mounting parts 210*a* and 210*b* is mounted on a separate respective shaft-like brake support 298*c* provided on a respective one of the fork blades 298*b* and 298*b* of the front fork 298 of the bicycle. In this embodiment, the front fork 298 is a suspension fork.

Each of the first and second mounting parts 210*a* and 210*b* is a shaft-like member having a fastening part 220 that includes an oblong hole 220*a* configured such that the respective brake support 298*c* can extend there-through. Each of the first and second mounting parts 210*a* and 210*b* is preferably fastened to the respective fork blade 298*b* with a hexagonal socket head cap screw 244 configured to screw into the brake support 298*c*.

A first brake arm 211 is mounted in a freely pivotal manner on the external circumference of the first mounting part 210*a* and a second brake arm 212 is mounted in a freely pivotal manner on the external circumference of the second mounting part 210*b*. The first brake arm 211 has a tubular pivotal mounting section 211*a* that is arranged at a lower end portion of the brake arm 211 and configured to be supported in a freely pivotal manner on the first mounting part 210*a*. The second brake arm 212 has a tubular pivotal mounting section 212*a* that is arranged at a lower end portion of the brake arm 212 and configured to be supported in a freely pivotal manner on the second mounting part 210*b*. The first brake arm 211 also has first arm section 211*b* configured to extend upward from the pivotal mounting section 211*a*. Similarly, the second brake arm 212 has a second arm section 212*b* that is configured to extend upward from the pivotal mounting section 212*a*. A brake shoe attaching part 213 for attaching a brake shoe 217 is provided at an intermediate portion of the arm section 211*b*. Similarly, a brake shoe attaching part 214 for attaching a brake shoe 218 is provided at an intermediate portion of the arm section 212*c*.

A mounting link 243 is connected to a tip end of the first arm section 211*b* in a freely pivotal manner. The mounting link 243 is configured to receive an outer anchoring part 240 mounted thereto. The outer casing 117*b* of the brake cable 117*f* is anchored (hooked onto) the outer anchoring part 240. An inner fastening part 242 configured to fasten the inner cable 117*a* using a bolt is provided on the upper end of the second arm section 212*b*. The first brake arm 211 is mounted to the mounting part 210*a* with a nut 230 that is screwed onto the mounting part 210*a*. The second brake arm 212 is mounted to the mounting part 210*b* with a nut 231 that is screwed onto the mounting part 210*b*.

In the second embodiment, the vertical positions of the brake shoes 217 and 218 are easily adjusted by loosening of the screws 244 which extend through respective ones of the oblong holes 220*a* in the fastening part 220 of the first and second mounting parts 210*a* and 210*b*, vertically repositioning the first and second brake arms 211 and 212 and then re-tightening the screws 244. Adjustment of the positioning of the brake shoes 217 and 218 with respect to the rim of the bicycle wheel is simple and rigidity and strength of the first and second brake arms 211 and 212 maintained.

Fourth Embodiment

Figure 8:
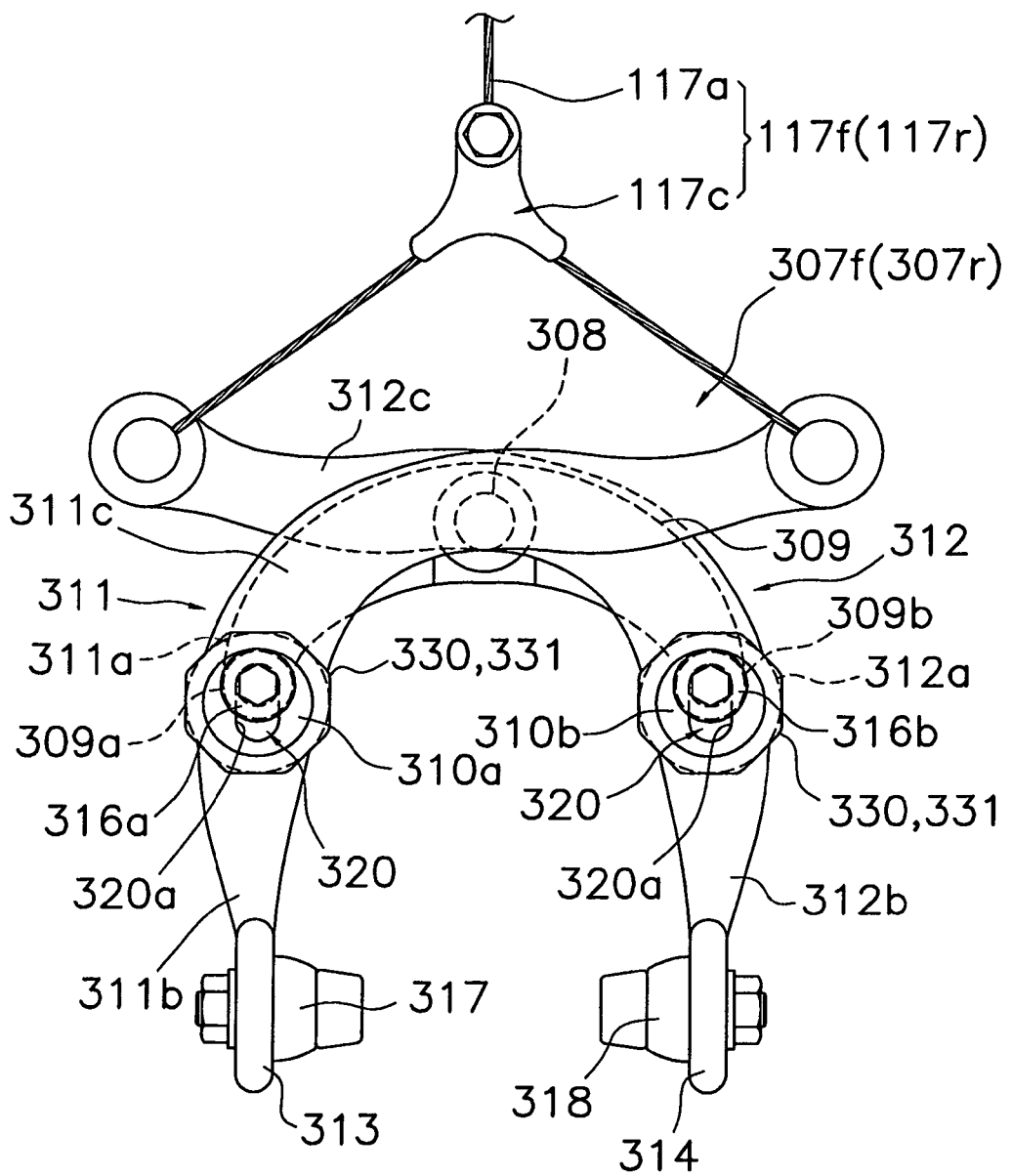
FIG. 8 is a front elevational view, similar to FIG. 4, showing a front rim brake assembly in accordance with a fourth embodiment of the present invention.

Referring now to FIG. 8, a center pull caliper brake assembly 307f in accordance with a fourth embodiment of the present invention will now be explained. Since the center pull caliper brake assembly 307f (front) and a rear center pull caliper brake assembly 307r are substantially the same, only description of center pull caliper brake assembly 307f is provided for the sake of brevity.

FIG. 8 shows an example of a center pull caliper brake assembly 307f that includes a brake shoe vertical adjustment configuration in accordance with the third embodiment of the present invention. In the embodiment shown in FIG. 8, an arm bridge 309 is fastened to the fork crown 98a of the front fork 98 of the bicycle. A pair of mounting seats 309a and 309b is provided on opposite ends or sides of the arm bridge 309. First and second mounting parts 310a and 310b are fastened to a respective one of the mounting seats 309a and 309b.

The mounting parts 310a and 310b are fastened to the mounting seats 309a and 309b with fastening shafts 316a and 316b. The fastening shafts 316a and 316b are preferably hexagonal socket head cap screws. The arm bridge 309 is a transversely (left to right) elongated arch-shaped member that is centered with respect to the fork crown 98a and fastened to the fork crown 98a with a fastening bolt 308 installed through the fork crown 98a. The fastening bolt 308 is a fastening shaft for attachment to the bicycle.

A first brake arm 311 is mounted in a freely pivotal manner on the external circumference of the first mounting part 310a, and a second brake arm 312 is mounted in a freely pivotal manner on the external circumference of the second mounting part 310b. Each of the first and second mounting parts 310a and 310b is a shaft-like member. Each of the first and second mounting parts 310a and 310b includes a fastening portion 320. Each fastening portion 320 includes an oblong hole 320a configured such that one of the respective fastening shafts 316a and 316b extends there-through.

The first brake arm 311 includes a pivotal mounting section 311a, a first arm section 311b and a first inner anchoring arm 311c. The second brake arm 312 includes a pivotal mounting section 312a, a second arm section 312b and a second inner anchoring arm 312c. The pivotal mounting sections 311a and 312a are configured to be supported in a freely pivotal manner on the external circumferential surface of a respective one of the first and second mounting parts 310a and 310b. The first and second arm sections 311b and 312b (respectively) are configured to extend downward from a respective one of the pivotal mounting sections 311a and 312a. The first and second inner anchoring arms 311c and 312c (respectively) are configured to extend inward from a respective one of the pivotal mounting sections 311a and 312a. The first and second inner anchoring arms 311c and 312c intersect each other.

A brake shoe attaching part 313 is provided on the lower end of the arm section 311b for attaching a brake shoe 317. Similarly, a brake shoe attaching part 314 is provided on the lower end of the arm section 311b for attaching a brake shoe 318. Opposite ends of a center wire 117c are anchored to the first and second inner anchoring arms 311c and 312c. Further, the tip end of the inner cable 117a is fastened to the center wire 117c. The first brake arm 311 is mounted to the first mounting part 310a with a nut 330 that is screwed onto the mounting part 310a, and the second brake arm 312 is mounted to the second mounting part 310b with a nut 331 that is screwed onto the mounting part 310b.

In a center pull brake device, the outer casing of the brake cable is anchored to the frame of the bicycle.

When the present invention is applied to the cantilever caliper brake assemblies 207f and 207r or center pull caliper brake assemblies 307f and 307r, the effects obtained are the same as described in the first embodiment.

Although the above described embodiments present a rim brake device that is operated with a brake cable as an example for explaining the present invention, the present invention can also be applied to a rim brake device that is operated with a hydraulic or pneumatic actuating mechanism.

Although the above described embodiments do not include a contrivance for preventing the mounting part from rotating, it is acceptable to configure the rim brake device such that the mounting part is prevented from rotating and such that the direction of the oblong hole or the arrangement direction of the through holes of the fastening portion is set to a prescribed direction (e.g., the vertical direction) when the brake device is installed.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. For example, the words "vertical direction" refer to the vertical direction of the bicycle and the words "left" and "right" refer to the sides or directions corresponding to left and right sides or directions, respectively, when the bicycle is viewed from the rear. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim brake assembly comprising:
   a pair of brake arms, each of the brake arms having an intermediate portion;

a pair of brake shoe attaching parts provided at an end of respective ones of the brake arms to form a side pull caliper brake assembly;

a mounting part having an outer perimeter with a cylindrical shape that pivotally supports the intermediate portions of the brake arms, the mounting part including a first axial face, a second axial face and an oblong fastening hole extending along a center axis of the mounting part between the first and second axial faces that is disposed within the outer perimeter of the mounting part and that is elongated along a first direction that approximately coincides with a vertical direction of the bicycle frame, the intermediate portions of the brake arms being pivotal about the center axis of the mounting part;

a securing structure retaining the brake arms on the outer perimeter of the mounting part; and a fastening shaft having a head part, a threaded part and a fixed fastening axis, the fastening shaft extending in an axial direction through the fastening hole of the mounting part, with the head part operatively pressing against the first axial face of the mounting part when the bicycle rim brake assembly is attached to a bicycle frame by the fastening shaft and the threaded part extending out of the oblong fastening hole of the mounting part for attachment to the bicycle frame, the fixed fastening axis being different from the center axis of the mounting part, the fastening shaft and the oblong fastening hole being structured to selectively fasten the mounting part between a plurality of mounting positions relative to the fastening shaft along the first direction that intersects with the axial direction, the fastening shaft being disposed inwardly of the outer perimeter of the mounting part in all of the mounting positions, the fixed fastening axis being fixed relative to the first direction in all of the mounting positions when the bicycle rim brake assembly is secured to the bicycle frame by the fastening shaft, and the mounting part and the brake arms being movable as a unit with respect to the fastening shaft between the plurality of mounting positions by loosening the fastening shaft with respect to the bicycle frame.

2. The bicycle rim brake assembly recited in claim 1, wherein the securing structure includes a thread formed on the outer perimeter of the mounting part, an axial abutment formed on the outer perimeter of the mounting part and a nut threaded on the thread formed on the outer perimeter of the mounting part.

3. The bicycle rim brake assembly recited in claim 2, wherein the securing structure further includes a pair of flanged bushes disposed on the outer perimeter of the mounting part, with one of the flanged bushes disposed on each side of the intermediate portions of the brake arms with respect to the axial direction.

\* \* \* \* \*